(No Model.)
H. HOBSON.
Plumb Level.
No. 238,687. Patented March 8, 1881.
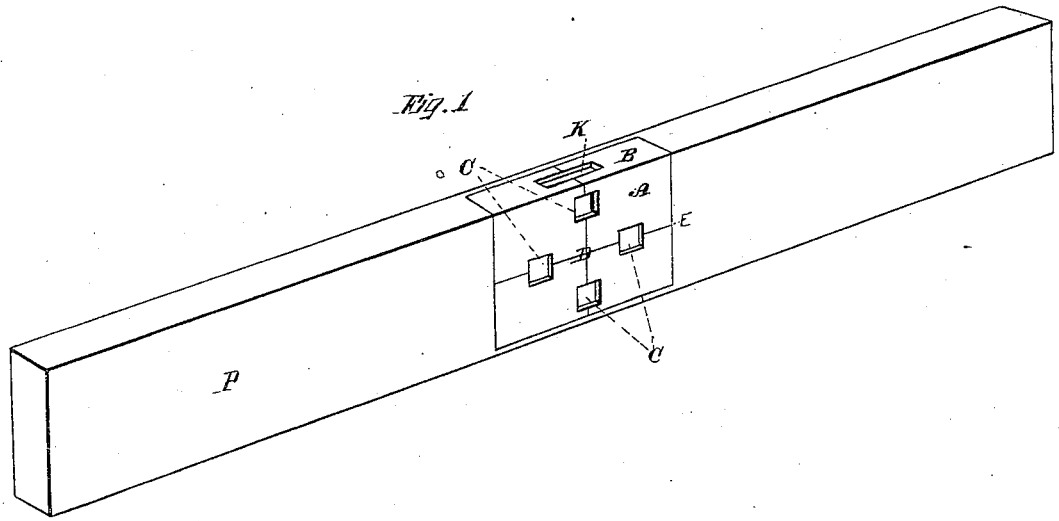
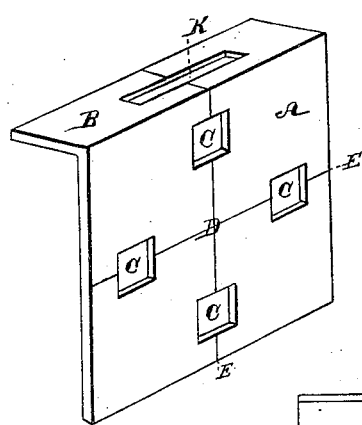
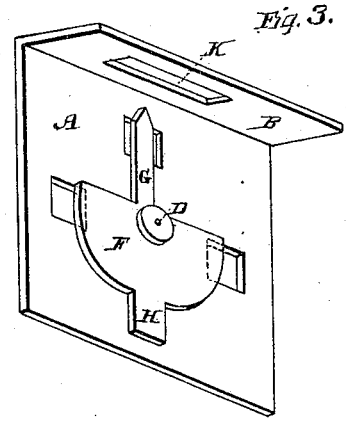
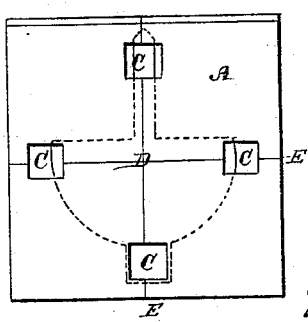
Witnesses
Geo. H. Strong
Frank A. Brooks
Inventor
Henry Hobson
By Dewey & Co.
Attys

UNITED STATES PATENT OFFICE.

HENRY HOBSON, OF SAN FRANCISCO, CALIFORNIA.

PLUMB-LEVEL.

SPECIFICATION forming part of Letters Patent No. 238,687, dated March 8, 1881.

Application filed November 18, 1880. (No model.)

*To all whom it may concern:*

Be it known that I, HENRY HOBSON, of the city and county of San Francisco, State of California, have invented a Plumb-Level; and I hereby declare the following to be a full, clear, and exact description thereof.

My invention relates to certain improvements in plumb-levels having for their object simplicity of construction with increased efficiency.

Referring to the accompanying drawings for a more complete explanation of my invention, Figure 1 is a view of a level, showing my invention. Figs. 2 and 3 are views of the angular plate. Fig. 4 is a front view of the same.

Let A represent a plate of metal, bent as shown, so as to form the top B, and set into the side of a common level-stock, P, in a similar manner to the way in which the frames of common plate-locks are set in drawers, the top B being flush with the top of the stock.

In the plate A are the four apertures C, set at equal distances from the common center D. The lines E are drawn from the centers of the apertures C, passing through the center D, and intersecting each other at right angles, as shown.

To the plate A, on its inner side, at the center D, is pivoted the weight or pendulum F. This weight F has the upper projection or arm, G, and the lower one, H, both extending so that they can be seen through the apertures C. The lower arm, H, is made of a size exactly to cover the apertures C, so that when the stock is level or plumb the arm H completely fills the opening and shuts out all the light. The opposite arm, G, is made a little narrower than the apertures C, so that when the stock is level or plumb it admits a slight line of light on either side. This is to assist the lower arm, H, because the eye can readily detect the slightest discrepancy in the width of the lines of light on either side of the arm G. A line passing through the center of the pendulum F passes through the center of the projecting arms G and H, and is visible through the apertures C when the arms are in line. Thus, looking at the stock either as a level or a plumb from the front, I have three tests or safeguards of its efficiency, to wit: First, the arm H completely covering and darkening the aperture C; second, the arm G appearing at an opposite aperture, C, and admitting two equal lines of light on either side, any discrepancy the eye is apt to detect; and the third, the central lines on the arms corresponding with the line E. A plate of glass is affixed to the inner side of the plate A and protects the apertures C from dust.

In the top B of the plate A, I cut the oblong opening K, so that I can look down upon the arm G. A line is drawn at right angles across the center of the opening K. The arm G is sharpened to a central edge or point, as shown, and when the stock is level the edge or point of the arm will correspond with the line across the opening K. Glazing covers the opening K for protection. Washers or other suitable device upon each side of the weight prevent friction.

The side apertures, C, enable me to look at the instrument from a considerable distance above to a distance below the level of the eye, and the top opening, K, facilitates its use when placed in a position to be looked down upon.

Having thus described my invention, what I claim as new, and desire to secure by Letters Patent, is—

1. A plumb-level consisting of the plate A, having the apertures C, in combination with the weight F, having the projecting arms G and H, substantially as herein described.

2. In a plumb-level, the weights F, with the arms G and H, the arm H to exactly fill the apertures C, and the arms G made narrower, so as to admit a passage of light upon each side of it when appearing at the aperture C, whereby the plumb or level is exactly determined, substantially as herein described.

In witness whereof I have hereunto set my hand.

HENRY HOBSON.

Witnesses:
S. H. NOURSE,
FRANK A. BROOKS.